(12) United States Patent
Chidlovskii et al.

(10) Patent No.: US 11,960,294 B2
(45) Date of Patent: Apr. 16, 2024

(54) SELF-SUPERVISED ATTENTION LEARNING FOR DEPTH AND MOTION ESTIMATION

(71) Applicants: NAVER CORPORATION, Gyeonggi-do (KR); NAVER LABS CORPORATION, Seongnam-si (KR)

(72) Inventors: Boris Chidlovskii, Meylan (FR); Assem Sadek, Grenoble (FR)

(73) Assignees: NAVER CORPORATION, Gyeonggi-Do (KR); NAVER LABS CORPORATION, Gyeonggi-Do (KR)

( * ) Notice: Subject to any disclaimer, the term of this patent is extended or adjusted under 35 U.S.C. 154(b) by 538 days.

(21) Appl. No.: 16/927,270

(22) Filed: Jul. 13, 2020

(65) Prior Publication Data

US 2022/0011778 A1 Jan. 13, 2022

(51) Int. Cl.
*G06K 9/00* (2022.01)
*G05D 1/00* (2006.01)
*G06N 3/045* (2023.01)
*G06T 3/00* (2006.01)
*G06T 7/136* (2017.01)
*G06T 7/73* (2017.01)

(52) U.S. Cl.
CPC ........... *G05D 1/0251* (2013.01); *G06N 3/045* (2023.01); *G06T 3/0093* (2013.01); *G06T 7/136* (2017.01); *G06T 7/75* (2017.01); *G06T 2207/10028* (2013.01); *G06T 2207/20081* (2013.01); *G06T 2207/30252* (2013.01)

(58) Field of Classification Search
CPC ........ G06N 3/0454; G06T 2207/30252; G06T 2207/30244; G06T 7/50
See application file for complete search history.

(56) References Cited

U.S. PATENT DOCUMENTS 10,354,151 B2 7/2019 Yoon et al.
10,810,752 B2 * 4/2020 Angelova .............. G06N 3/084
(Continued)

OTHER PUBLICATIONS

Renyue Dai, Yongbin Gao, Zhijun Fang, Xiaoyan Jiang, Anjie Wang, Juan Zhang, Cengsi Zhong, Unsupervised learning of depth estimation based on attention model and global pose optimization, Signal Processing: Image Communication, vol. 78,2019, pp. 284-292, ISSN 0923-5965 Publication date Jul. 2019 (Year: 2019).*

(Continued)

*Primary Examiner* — Emily C Terrell
*Assistant Examiner* — Owais Iqbal Memon

(57) ABSTRACT

A system includes: a depth module including an encoder and a decoder and configured to: receive a first image from a first time from a camera; and based on the first image, generate a depth map including depths between the camera and objects in the first image; a pose module configured to: generate a first pose of the camera based on the first image; generate a second pose of the camera for a second time based on a second image; and generate a third pose of the camera for a third time based on a third image; and a motion module configured to: determine a first motion of the camera between the second and first times based on the first and second poses; and determine a second motion of the camera between the second and third times based on the second and third poses.

20 Claims, 11 Drawing Sheets

(5 of 11 Drawing Sheet(s) Filed in Color)

(56) References Cited

U.S. PATENT DOCUMENTS

| | | | | |
|---|---|---|---|---|
| 2020/0378793 | A1* | 5/2020 | Xiao | G06N 3/045 |
| 2020/0319652 | A1* | 10/2020 | Kang | G06T 7/20 |
| 2021/0319577 | A1* | 10/2021 | Tang | G06T 3/4007 |
| 2021/0319578 | A1* | 10/2021 | Casser | G06T 7/55 |

OTHER PUBLICATIONS

Oktay, Ozan, et al. "Attention u-net: Learning where to look for the pancreas." arXiv preprint arXiv:1804.03999 (2018). (Year: 2018).*
Zhou, Tinghui, et al. "Unsupervised learning of depth and ego-motion from video." Proceedings of the IEEE conference on computer vision and pattern recognition. 2017. (Year: 2017).*
Yasin Almalioglu, Muhamad Risqi U. Saputra, Pedro P. B. de Gusmao, Andrew Markham, and Niki Trigoni. GANVO: Unsupervised Deep Monocular Visual Odometry and Depth Estimation with Generative Adversarial Networks. In Proceedings of ICRA, 2019.
V. Madhu Babu, Kaushik Das, Anima Majumder, and Swagat Kumar. Undemon: Unsupervised deep network for depth and ego-motion estimation. In IEEE/RSJ International Conference on Intelligent Robots and Systems, IROS, pp. 1082-1088, 2018.
Jiawang Bian, Zhichao Li, Naiyan Wang, Huangying Zhan, Chunhua Shen, Ming-Ming Cheng, and Ian D. Reid. Unsupervised scaleconsistent depth and ego-motion learning from monocular video. In Proc. NIPS, pp. 35-45, 2019.
Sneha Chaudhari, Gungor Polatkan, Rohan Ramanath, and Varun Mithal. An attentive survey of attention models. CoRR, abs/1904.02874, 2019.
Jos'e Luis Blanco Claraco. A tutorial on se(3) transformation parameterizations and on-manifold optimization. Technical report, 2019.
D. Eigen and R. Fergus. Predicting Depth, Surface Normals and Semantic Labels with a Common Multi-scale Convolutional Architecture. In Proc. IEEE International Conference on Computer Vision (ICCV), 2015.
David Eigen, Christian Puhrsch, and Rob Fergus. Depth Map Prediction from a Single Image using a Multi-Scale Deep Network. In Proc. NIPS, pp. 2366-2374, 2014.
Ravi Garg, Vijay Kumar BG, Gustavo Carneiro, and Ian Reid. Unsupervised CNN for Single View Depth Estimation: Geometry to the Rescue. Mar. 2016.
Andreas Geiger, Philip Lenz, and Raquel Urtasun. Are we ready for Autonomous Driving? The KITTI Vision Benchmark Suite. Technical report.
Cl'ement Godard, Oisin Mac Aodha, and Gabriel J. Brostow. Unsupervised Monocular Depth Estimation with Left-Right Consistency. In Proc. IEEE Conference on Computer Vision and Pattern Recognition, pp. 6602-6611, 2017.
Cl'ement Godard, Oisin Mac, Aodha Gabriel, and J Brostow. Unsupervised Monocular Depth Estimation with Left-Right Consistency. Technical report.
Cristopher G'omez, Mat'?as Mattamala, Tim Resink, and Javier Ruiz-del Solar. Visual SLAM-based Localization and Navigation for Service Robots: The Pepper Case. Nov. 2018.
Qin Huang, Chunyang Xia, Chi-Hao Wu, Siyang Li, Ye Wang, Yuhang Song, and C.-C. Jay Kuo. Semantic segmentation with reverse attention. In Proc. BMVC, 2017.
Max Jaderberg, Karen Simonyan, Andrew Zisserman, and Koray Kavukcuoglu. Spatial Transformer Networks. Jun. 2015.
Saumya Jetley, Nicholas A. Lord, Namhoon Lee, and Philip H. S. Torr. Learn to pay attention. In Proc. International Conference on Learning Representations, ICLR, 2018.

Alex Kendall, Matthew Grimes, and Roberto Cipolla. PoseNet: A Convolutional Network for Real-Time 6-DOF Camera Relocalization. May 2015.
Fayao Liu, Chunhua Shen, Guosheng Lin, and Ian Reid. Learning Depth from Single Monocular Images Using Deep Convolutional Neural Fields. IEEE Transactions on Pattern Analysis and Machine Intelligence, 2016.
Reza Mahjourian, Martin Wicke, and Anelia Angelova. Unsupervised Learning of Depth and Ego-Motion from Monocular Video Using 3d Geometric Constraints. In Proc. IEEE Conference on Computer Vision and Pattern Recognition, pp. 5667-5675, 2018.
Raul Mur-Artal, J. M.M. Montiel, and Juan D. Tardos. ORB-SLAM: A Versatile and Accurate Monocular SLAM System. IEEE Transactions on Robotics, 31(5):1147-1163, Oct. 2015.
Raul Mur-Artal and Juan D. Tardos. ORB-SLAM2: An Open-Source SLAM System for Monocular, Stereo, and RGB-D Cameras. IEEE Transactions on Robotics, 33(5):1255-1262, Oct. 2017.
Ozan Oktay, Jo Schlemper, Lo''?c Le Folgoc, Matthew C. H. Lee, Mattias P. Heinrich, Kazunari Misawa, Kensaku Mori, Steven G. McDonagh, Nils Y. Hammerla, Bernhard Kainz, Ben Glocker, and Daniel Rueckert. Attention u-net: Learning where to look for the pancreas. arXiv:1804.03999, 2018.
Jo Schlemper, Ozan Oktay, Liang Chen, Jacqueline Matthew, Caroline Knight, Bernhard Kainz, Ben Glocker, and Daniel Rueckert. Attention-Gated Networks for Improving Ultrasound Scan Plane Detection. arXiv:1804.05338, 2018.
Tianwei Shen, Zixin Luo, Lei Zhou, Hanyu Deng, Runze Zhang, Tian Fang, and Long Quan. Beyond photometric loss for self-supervised ego-motion estimation. In Proc. International Conference on Robotics and Automation, ICRA, pp. 6359-6365, 2019.
Sudheendra Vijayanarasimhan, Susanna Ricco, Cordelia Schmid, Rahul Sukthankar, and Katerina Fragkiadaki. SfM-Net: Learning of Structure and Motion from Video. arXiv:1704.07804, 2017.
Fei Wang, Mengqing Jiang, Chen Qian, Shuo Yang, Cheng Li, Honggang Zhang, Xiaogang Wang, and Xiaoou Tang. Residual attention network for image classification. In Proc. IEEE Conference on Computer Vision and Pattern Recognition, CVPR, pp. 6450-6458, 2017.
G. Wang, H. Wang, Y. Liu, and W. Chen. Unsupervised learning of monocular depth and ego-motion using multiple masks. In Proc. International Conference on Robotics and Automation (ICRA), pp. 4724-4730, May 2019.
Yang Wang, Zhenheng Yang, Peng Wang, Yi Yang, Chenxu Luo, and Wei Xu. Joint unsupervised learning of optical flow and depth by watching stereo videos. arXiv: 1810.03654, 2018.
Dan Xu, Wei Wang, Hao Tang, Hong Liu, Nicu Sebe, and Elisa Ricci. Structured Attention Guided Convolutional Neural Fields for Monocular Depth Estimation. arXiv:1803.11029, 2018.
Kelvin Xu, Jimmy Ba, Ryan Kiros, Kyunghyun Cho, Aaron C. Courville, Ruslan Salakhutdinov, Richard S. Zemel, and Yoshua Bengio. Show, attend and tell: Neural image caption generation with visual attention. In Proc. International Conference on Machine Learning, ICML, pp. 2048-2057, 2015.
Tinghui Zhou, Matthew Brown, Noah Snavely, and David G. Lowe. Unsupervised Learning of Depth and Ego-Motion from Video. In Proc. IEEE International Conference on Computer Vision, pp. 6612-6619, 2017.
Yi Zhou, Connelly Barnes, Jingwan Lu, Jimei Yang, and Hao Li. On the continuity of rotation representations in neural networks. In Proc. IEEE Conference on Computer Vision and Pattern Recognition, CVPR, pp. 5745-5753, 2019.
Korean Office Action for Korean Application No. 10-2021-0054522 dated Jul. 10, 2023.

* cited by examiner

SELF-SUPERVISED ATTENTION LEARNING FOR DEPTH AND MOTION ESTIMATION

FIELD

The present disclosure relates to visual navigation and more particularly to systems and methods for depth and motion estimation.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are mobile robots that may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants from a pickup to a destination.

SUMMARY

In a feature, a system includes: a depth module including an encoder and a decoder and configured to: receive a first image from a first time from a camera; and based on the first image and using the encoder and the decoder, generate a depth map including depths between the camera and objects in the first image; a pose module configured to: generate a first pose of the camera based on the first image; generate a second pose of the camera for a second time based on a second image received from the camera before the first image; and generate a third pose of the camera for a third time based on a third image received from the camera after the first image; and a motion module configured to: determine a first motion of the camera between the second time and the first time based on the first pose and the second pose; and determine a second motion of the camera between the second time and the third time based on the second pose and the third pose.

In a feature, a vehicle includes: the system; a propulsion device configured to propel the vehicle; and a control module configured to actuate the propulsion device based on the depth map.

In further features, the vehicle includes the camera and does not include any other cameras.

In further features, the vehicle does not include any radars, any sonar sensors, any laser sensors, or any light detection and ranging (LIDAR) sensors.

In a feature, a vehicle includes: the system; a propulsion device configured to propel the vehicle; and a control module configured to actuate the propulsion device based on at least one of: the first motion; and the second motion.

In further features, the first, second, and third poses are 6 degree of freedom poses.

In further features, the depth module includes attention mechanisms configured to, based on the first image, generate an attention map including attention coefficients indicative of amounts of attention to attribute to the objects in the first image.

In further features, the attention mechanisms include attention gates.

In further features, the decoder includes the attention mechanisms.

In further features, the encoder does not include any attention mechanisms.

In further features, the decoder includes decoder layers and the attention mechanisms are interleaved with the decoder layers.

In further features, the system further includes: a first reconstruction module configured to reconstruct the second image using the attention map to produce a reconstructed second image; a second reconstruction module configured to reconstruct the third image using the attention map to produce a reconstructed third image; and a training module configured to, based on at least one of the reconstructed second image and the reconstructed third image, selectively adjust at least one parameter of at least one of depth module, the pose module, and the motion module.

In further features, the training module is configured to selectively adjust the at least one parameter based on the reconstructed second image, the reconstructed third image, the second image, and the third image.

In further features, the training module is configured to selectively adjust the at least one parameter based on: a first difference between the reconstructed second image and the second image; and a second difference between the reconstructed third image and the third image.

In further features, the training module is configured to jointly train the depth module, the pose module, and the motion module.

In further features: the first reconstruction module is configured to reconstruct the second image using an image warping algorithm and the attention map; and the second reconstruction module is configured to reconstruct the third image using the image warping algorithm and the attention map.

In further features, the image warping algorithm includes an inverse image warping algorithm.

In further features, the pose module is configured to generate the first, second, and third poses using a PoseNet algorithm.

In further features, the depth module includes a DispNet encoder-decoder network.

In a feature, a method includes: receiving a first image from a first time from a camera; based on the first image, generating a depth map including depths between the camera and objects in the first image; generating a first pose of the camera based on the first image; generating a second pose of the camera for a second time based on a second image received from the camera before the first image; and generating a third pose of the camera for a third time based on a third image received from the camera after the first image; determining a first motion of the camera between the second time and the first time based on the first pose and the second pose; and determining a second motion of the camera between the second time and the third time based on the second pose and the third pose.

In a feature, a system includes: one or more processors; and memory including code that, when executed by the one or more processors, perform functions including: receiving a first image from a first time from a camera; based on the first image, generating a depth map including depths between the camera and objects in the first image; generating a first pose of the camera based on the first image; generating a second pose of the camera for a second time based on a second image received from the camera before the first image; and generating a third pose of the camera for a third time based on a third image received from the camera after the first image; determining a first motion of the camera between the second time and the first time based on the first pose and the second pose; and determining a second motion of the camera between the second time and the third time based on the second pose and the third pose.

In a feature, a system includes: a first means for: receiving a first image from a first time from a camera; and based on the first image, generating a depth map including depths between the camera and objects in the first image; a second means for: generating a first pose of the camera based on the first image; generating a second pose of the camera for a second time based on a second image received from the camera before the first image; and generating a third pose of the camera for a third time based on a third image received from the camera after the first image; and a third means for: determining a first motion of the camera between the second time and the first time based on the first pose and the second pose; and determining a second motion of the camera between the second time and the third time based on the second pose and the third pose.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

Visual navigation of mobile robots combines the domains of vision and control. Navigation can be described as finding a suitable and non-obstructed path between a starting location and a destination location. A navigating robot includes a control module configured to move the navigating robot based on input from one or more sensors (e.g., a camera).

The present application involves a depth and motion module configured to estimate depth (distance to objects) in images from the camera and to estimate movement of the navigating robot based on the images. The movement may be used, for example, to determine a location of the navigating robot, such as within a building, and to move the navigating robot. The depth may also be used for movement of the robot, such as for object avoidance and/or route planning.

Figure 1:
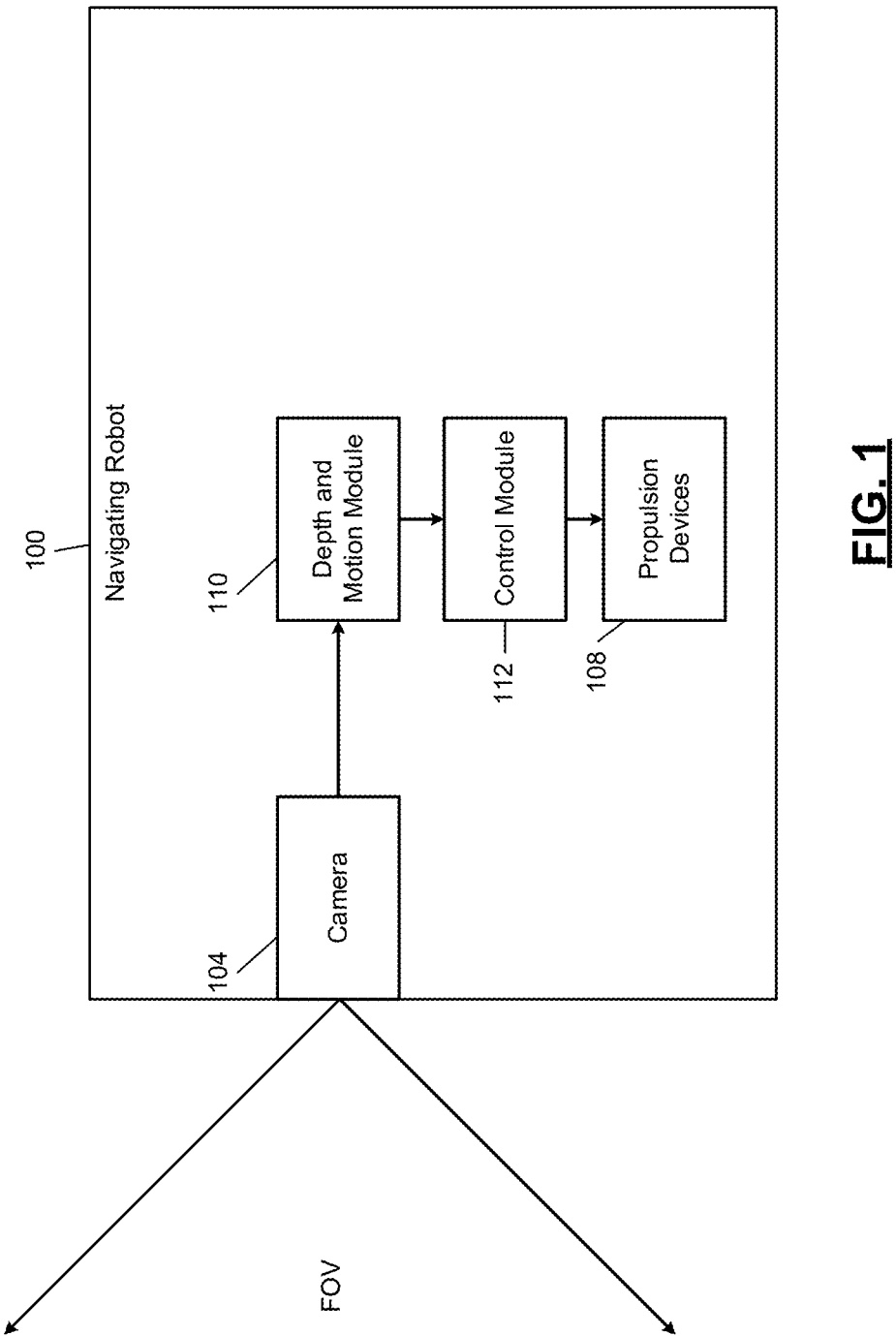
FIG. 1 is a functional block diagram of an example implementation of a navigating robot.

FIG. 1 is a functional block diagram of an example implementation of a navigating robot 100. The navigating robot 100 is a vehicle. The navigating robot 100 includes a camera 104 that captures images within a predetermined field of view (FOV) in front of the navigating robot 100. The predetermined FOV may be less than 360 degrees around the navigating robot 100. The navigating robot 100 may have less than a full 360 degree FOV around the navigating robot 100. The operating environment of the navigating robot 100 may be an indoor space (e.g., a building) or an outdoor space.

The camera 104 may be, for example, a grayscale camera, a red, green, blue (RGB) camera, or another suitable type of camera. In various implementations, the camera 104 may not capture depth (D) information, such as in the example of a grayscale-D camera or a RGB-D camera. The camera 104 may be fixed to the navigating robot 100 such that the orientation of the camera 104 relative to the navigating robot 100 remains constant.

In various implementations, the navigating robot 100 may not include any other types of object detection sensors. For example, the navigating robot 100 may not include any radar sensors, sonar sensors, cameras, laser sensors, or light detection and ranging (LIDAR) sensors. The inclusion of only the camera 104 may render the navigating robot 100 less expensive than navigating robots having one or more additional object detection sensors. The present application involves estimating depth of items in the FOV of the camera 104 and motion of the navigating robot 100 based on images from the camera 104.

The navigating robot 100 includes one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly.

The navigating robot 100 includes a depth and motion module 110 trained to estimate depth of objects in the FOV of the camera 104 (in front of the navigating robot 100) and motion of the navigating robot 100 based on images from the camera 104. More specifically, the depth and motion module 110 is trained to estimate depth of objects in the FOV of the camera 104 at time t based on the image at time t. The depth and motion module 100 is trained to estimate the motion from time t to a next time t+1 after time t based on the image at time t and the image at time t+1. The depth and motion module 100 is trained to estimate the motion from a last time t−1 to time t based on the image at time t and the image at time t−1.

The camera 104 may update at a predetermined frequency, such as 60 hertz (Hz), 120 Hz, or another suitable frequency. The depth and motion module 110 may generate a depth and the estimated motions (from t−1 to t and from t to t+1) each time an image is received from the camera 104.

Once trained, the depth and motion module 110 is used by the navigating robot 100 to estimate depth and motion. Training of the depth and motion module 110 is discussed below.

A control module 112 is configured to control the propulsion devices 108 to navigate, such as from a starting location to a goal location, based on the depth and the motion. The depth may include a map of depth (distance to closest object) in each pixel of an image. Based on the depth, the control module 112 may determine an action to be taken by the navigating robot 100. For example, the control module 112 may actuate the propulsion devices 108 to move the navigating robot 100 forward by a predetermined distance under some circumstances based on the depth. The control module 112 may actuate the propulsion devices 108 to move the navigating robot 100 backward by a predetermined distance under some circumstances based on the depth. The control module 112 may actuate the propulsion devices 108 to turn the navigating robot 100 to the right by the predetermined angle under some circumstances based on the depth. The control module 112 may actuate the propulsion devices 108 to turn the navigating robot 100 to the left by the predetermined angle under some circumstances based on the depth. The control module 112 may not actuate the propulsion devices 108 to not move the navigating robot 100 under some circumstances based on the depth. The control module 112 may actuate the propulsion devices 108 to move the navigating robot 100 upward under some circumstances based on the depth. The control module 112 may actuate the propulsion devices 108 to move the navigating robot 100 downward under some circumstances based on the depth.

The control module 112 may adjust control of one or more of the propulsion devices 108 based on one or more of the estimated motions. For example, if the control module 112 controlled a propulsion device to turn the navigating robot 100 right by the predetermined angle and the depth and motion module 110 indicates that the navigating robot 100 turned by less than the predetermined angle, the control module 112 may adjust actuation of the propulsion device to turn the navigating robot 100 right by closer to or to the predetermined angle. The same may be true for moving forward, left, backward, upwardly, or downwardly.

Figure 2:
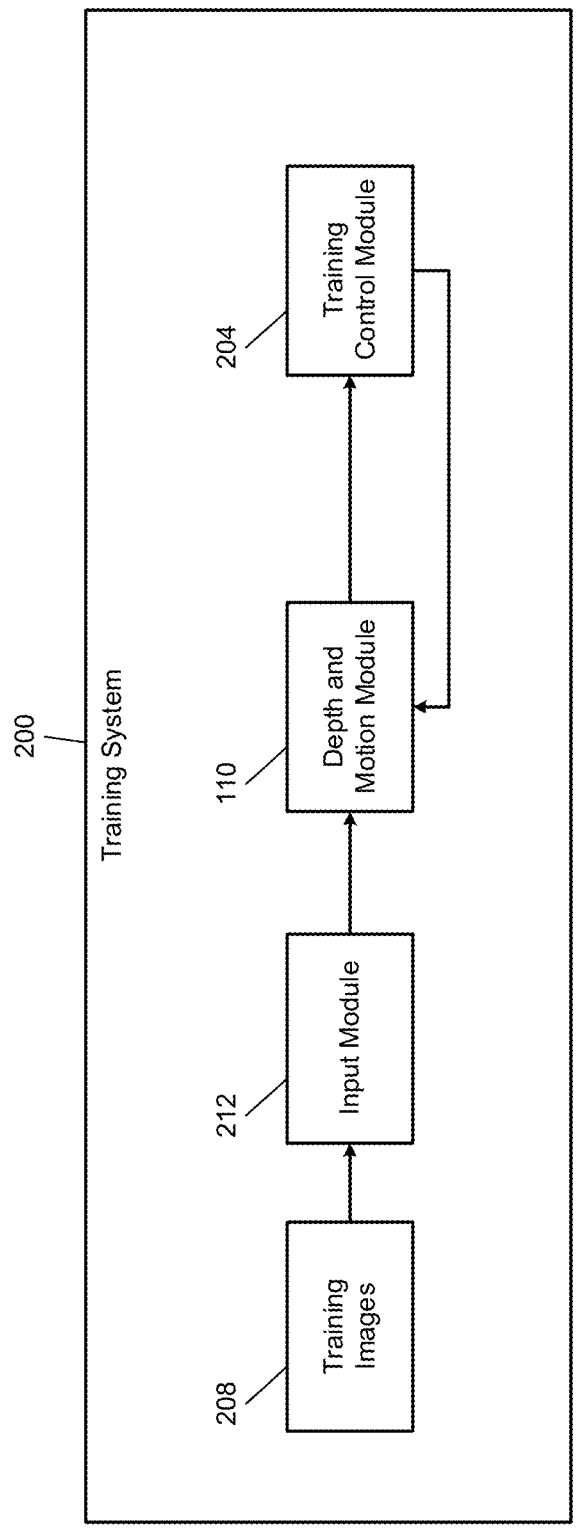
FIG. 2 is a functional block diagram of an example training system for training and generating a depth and motion module for visual navigation by navigating robots.

FIG. 2 includes a functional block diagram of an example training system 200 for training the depth and motion module 110 for depth and motion estimation, such as by the navigating robot 100. A training module 204 trains the depth and motion module 110 using a set of training images 208 stored in memory as discussed further below. An inputting module 212 selects ones of the training images 208, such as in a predetermined order.

Figure 3:
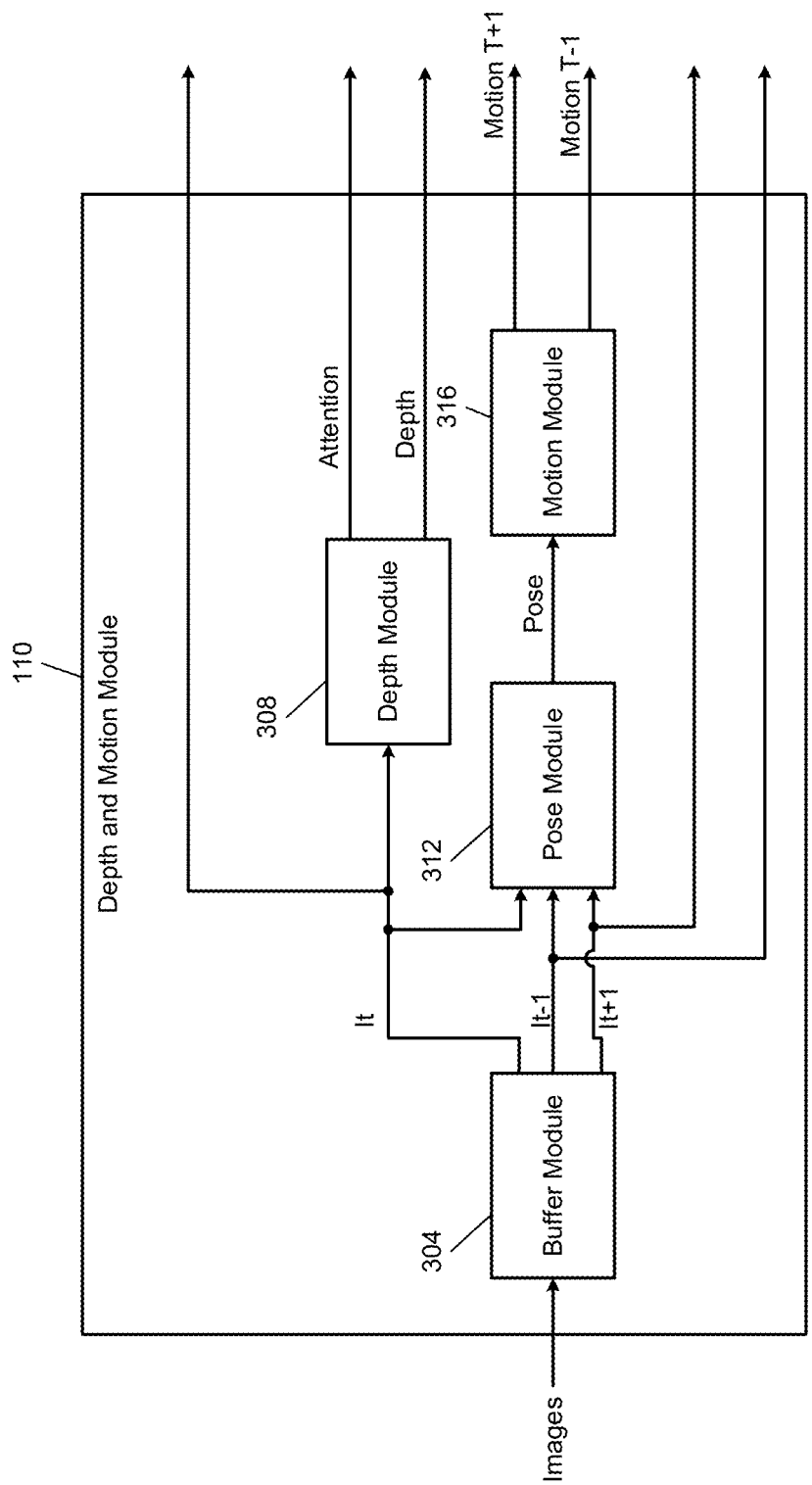
FIG. 3 is a functional block diagram of an example implementation of a depth and motion module.

FIG. 3 is a functional block diagram of an example implementation of the depth and motion module 110. A buffer module 304 receives images, such as the images from the camera 104 during operation of the navigating robot 100 or the training images during training of the depth and motion module 110. The buffer module 304 stores at least three images taken at three consecutive times, respectively, and may store more images from more consecutive times, respectively. Three images ($I_t$, $I_{t-1}$, and $I_{t+1}$) from three times (time t, time t−1 immediately before time t, and time t+1 immediately after time t) are shown in FIG. 3.

A depth module 308 determines a depth map (a depth at each pixel) at time t based on the image from time t ($I_t$). The depth module 308 also determines an attention map (including an attention value at each pixel) at time t based on the image from time t.

A pose module 312 determines poses of a camera at time t, time t−1, and time t+1 based on the images at time t, time t−1, and time t+1, respectively. The poses may be, for example, relative poses or absolute poses. The poses may be 6 degree of freedom (6DoF) poses.

A motion module 316 determines a motion between time t−1 and time t based on a difference between the pose at time t−1 and the pose at time t. The motion module 316 determines a motion between time t and time t+1 based on a difference between the pose at time t and the pose at time t+1. During operation of the navigating robot 100, the poses are the poses of the camera 104, and the motions are the motions (changes in position) of the navigating robot 100. During training, the poses are the poses of the camera that captured the training images, and the motions (changes in position) are the motions of a vehicle to which the camera that captured the training images is fixed.

During operation of the navigating robot 100, the control module 112 may actuate the propulsion devices 108 based on the depth and/or the motion, such as described above. The depth and motion module 110 updates the depth and the motions each time a new image is received. New images may be received every predetermined period. The predetermined period is the period between time t−1 and time t and the period between time t and time t+1.

Figure 4:
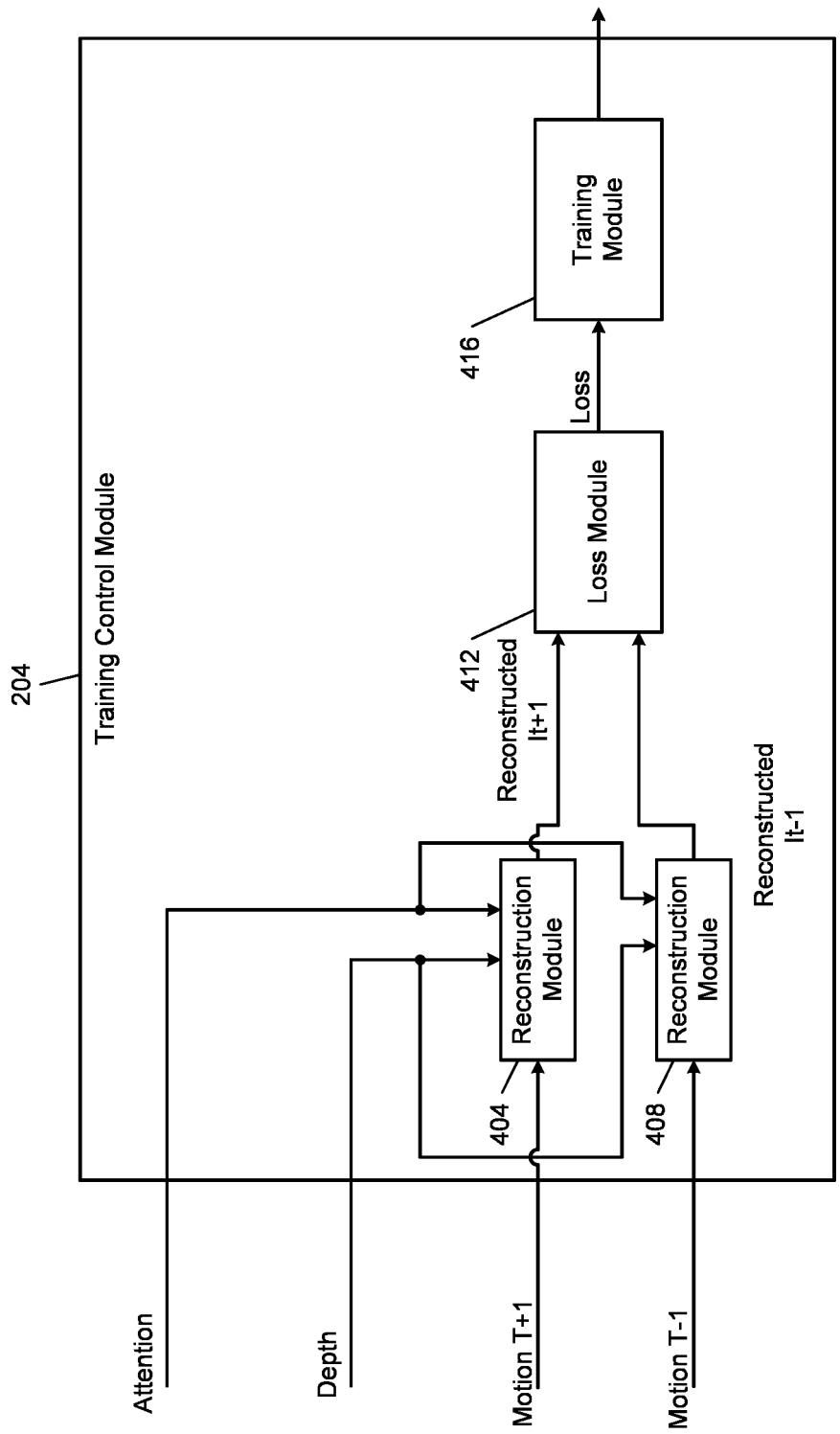
FIG. 4 is a functional block diagram of an example implementation of a training control module.

FIG. 4 is a functional block diagram of an example implementation of the training control module 204. The training control module 204 operates during training of the depth and motion module 110. Training of the depth and motion module 110 is performed before the depth and motion module 110 is stored to the navigating robot 100 for operation of the navigating robot 100.

A reconstruction module 404 reconstructs the image at time t+1 from the motion between time t and time t+1, the attention map, and the depth map at time t+1. The reconstruction module 404 may reconstruct the image at time t+1 using, for example, an inverse image warping algorithm or another suitable type of image reconstruction algorithm. The reconstruction module 404 produces a reconstructed image at time t+1 (reconstructed $I_{t+1}$).

A reconstruction module 408 reconstructs the image at time t−1 from the motion between time t−1 and time t, the attention map, and the depth (map) at time t−1. The reconstruction module 408 may reconstruct the image at time t−1 using, for example, the inverse image warping algorithm or another suitable type of image reconstruction algorithm. The reconstruction module 408 produces a reconstructed image at time t−1 (reconstructed $I_{t-1}$).

A loss module 412 determines a loss based on the reconstructed images at times t+1 and t−1 and the original images at times t+1 and t−1. The loss module 412 may determine the loss, for example, based on a first difference between the reconstructed image at time t+1 and the image at time t+1 and a second difference between the reconstructed image at time t−1 and the image at time t−1. The loss module 412 may determine the loss using a loss algorithm or a lookup table that relates the inputs to the outputs.

A training module 416 selectively adjusts one or more parameters (e.g., weight values) of the depth and motion module 110 based on one or more values of the loss, such as to minimize the loss or adjust the loss toward zero. In various implementations, the training module 416 may wait to selectively adjust one or more parameters until a predetermined number of training images have been input and losses determined. the predetermined number may be, for example, 100, 200, 500, 1000, or another suitable number. A predetermined number of epochs, each including the predetermined number of training images, may be used to train the depth and motion module 110. The predetermined number of epochs may be, for example, 10, 50, 100, 250, 1000, or another suitable number.

Figure 5:
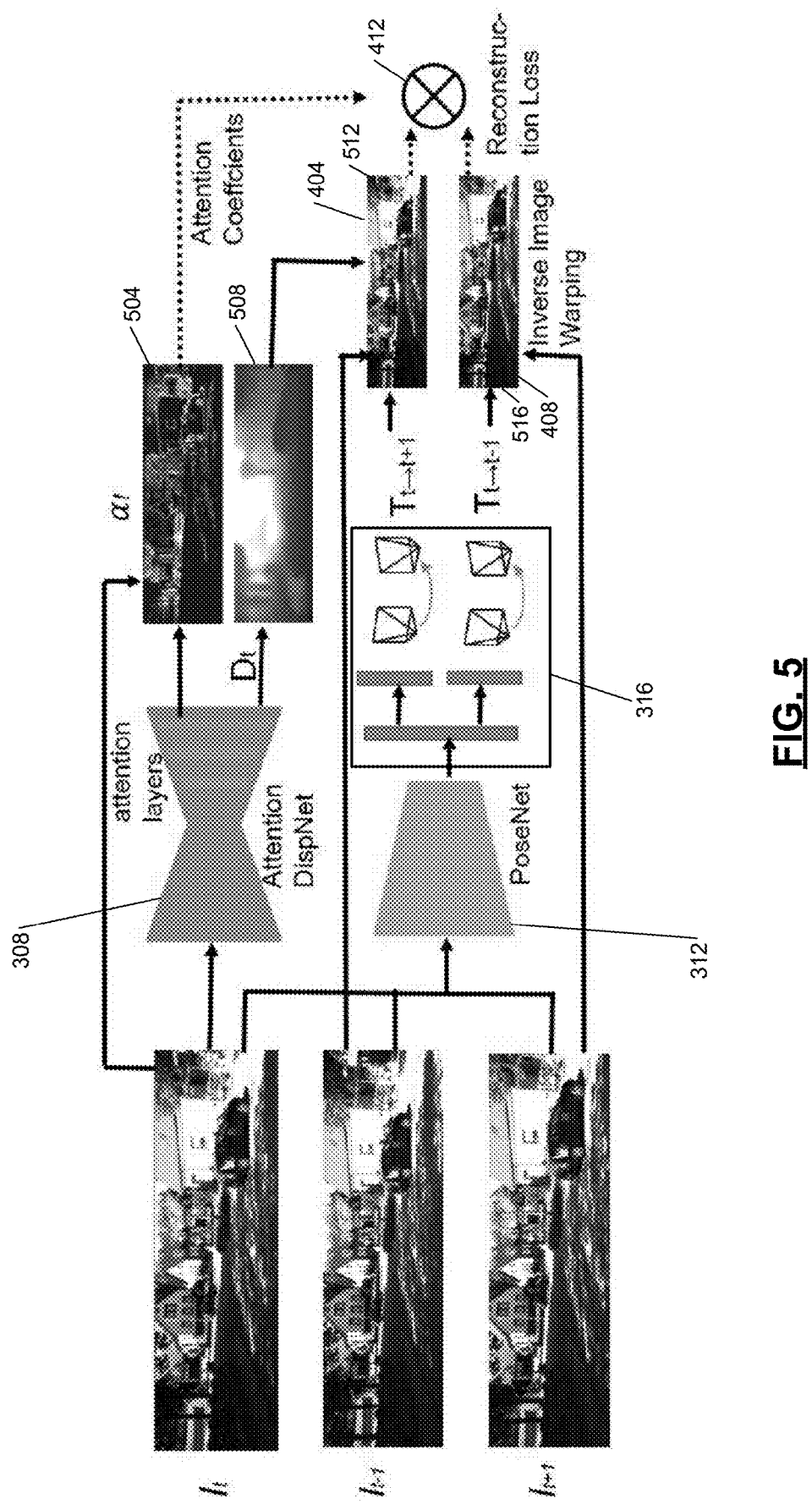
FIG. 5 is a functional block diagram including portions of the depth and motion module and the training control module.

FIG. 5 is a functional block diagram including portions of the depth and motion module 110 and the training control module 204. In FIG. 5, an example attention map 504 and an example depth map 508 generated based on an input image ($I_t$) are shown. In the depth map 508, the depth module 308 may make a pixel lighter (whiter) when the closest object to the camera in that pixel is further from the camera. The depth module 308 may make a pixel darker (blacker) when the closest object to the camera in that pixel is closer from the camera. Thus, darker pixels indicate that objects are closer to the camera, and vice versa.

In the attention map 504, the depth module 308 may make pixels with more distinct features lighter (whiter). The depth module 308 may make a pixel darker (blacker) when it includes less distinct features. Thus, darker pixels indicate that objects are closer to the camera, and vice versa.

In FIG. 5, example reconstructed images 512 and 516 are also shown.

The depth module 308 may include an encoder-decoder network, such as the DispNet encoder-decoder network or another suitable type of encoder-decoder network. The depth module 308 receives an input image and generates disparity values $D_t(p)$ for every pixel p in the input image.

The pose module 312 may generate the poses using a pose estimation algorithm, such as the PoseNet algorithm or another suitable pose estimation algorithm. The pose module 312 receives the images $I_t$, $I_{t−1}$, and $I_{t+1}$. In various implementations, $I_{t−1}$ and $I_{t+1}$ may be referred to as neighbor (source) images Is, where s∈{t−1, t+1}. Based on the input images, using the pose estimation algorithm, the pose module 312 generates transformation matrices $\widehat{T_{t \to s}}$, which may represent the 6 degrees of freedom pose (6DoF) relative pose between the images.

The training control module 204 utilizes self-supervised learning/training. This is preceded by image reconstruction, such as using the inverse warping algorithm. Being differentiable, this allows the training control module 204 to back propagate gradients to the depth and motion module 110 during training.

The training control module 204 reconstructs the target image $I_t$ by sampling pixels from the source images Is based on the disparity map $D_t$ and the relative pose transformation matrices $\widehat{T_{t \to s}}$. The training control module 204 may sample projecting the homogeneous coordinates of a target pixel $p_t$ onto that pixel $p_s$ in the source image. Given the camera intrinsics K, the estimated depth of the pixel $D_t(p)$ and transformation $\widehat{T_{t \to s}}$, the training control module 204 may perform the projection using $$p_s \sim K \widehat{T}_{t \to s} \hat{D}_t(p_t) K^{-1} p_t$$

For non-discrete values of $p_s$, the training control module 204 may perform differentiable bi-linear sampling interpolation to find the intensity value at that position (pixel). The mean intensity value in the reconstructed image may be interpolated by the training control module 204 is interpolated using the 4 (e.g., diagonal) pixel neighbors of that pixel (e.g., above right, above left, below left, and below right), such as follows $$\hat{I}_s(pt) = I_s(ps) = \sum_{i \in \{t,b\}, j \in \{l,r\}} w^{ij} I_s(p_s^{ij})$$

where $\hat{I}_s(p_t)$ is the intensity value of $p_t$ in the reconstructed image $I_s$. The weight $w^{ij}$ may be linearly proportional to the spatial proximity between the pixel $p_s$ and the neighbor pixel $p_s^{ij}$. The four weights $w^{ij}$ may sum to 1.

Under the static world assumptions, a photometric loss may be defined as an $L_1$ loss objective function: $\mathcal{L}_p = \Sigma_s \Sigma_p |I_t(p) − \hat{I}_s(p)|$. Any violation of the static world assumption in the real scenes may affects the reconstruction. To overcome this, the training control module 204 may use an explainability mask to indicate the importance of a pixel in the warped images. If the pixel contributes to a corrupted synthesis, the training control module 204 will set the explainability value of the pixel to a negligible value. The training control module 204 may include explainability module to generate the explainability modules. The explainability module may generate the explainability modules based on the warped images using an explainability algorithm, such as ExpNet or another suitable explainability algorithm. ExpNet may share an (or have the same type of) encoder with the pose module and branch off at a (or have a different) decoder portion of the pose module 312

The training control module 204 trains the three modules, for depth, pose, and explainability simultaneously (jointly). The decoder of the explainability module generates a per pixel mask $\hat{E}_k(p)$. The explainability module generates the explainability values for each of the source images. Per pixel explainability values are embedded (or included) in the photometric loss:

$$\mathcal{L}_P = \frac{1}{V} \sum_p \hat{E}_k(p) |I_t(p) - \hat{I}_s(p)|$$

where |V| is the number of pixels in the image. To avoid a trivial solution in the equation above with (3) with $\hat{E}_k(p)=0$, the explainability module may apply a constraint on the values of $\hat{E}_k(p)$. This constraint may be implemented as a regularization loss $\mathcal{L}_{reg}(\hat{E}_k)$, which may be defined as a cross-entropy loss between the mask value and a constant, such as 1.

For depth smoothness pixel to pixel, the training control module 204 may use a smoothness term to resolve gradient-locality and remove discontinuity of the learned depth in low-texture regions. For example, the training control module 204 may use an edge-aware depth smoothness loss which uses image gradient to weigh the depth gradient:

$$\mathcal{L}_{smo} = \sum_p |\nabla D(p)|^T \cdot e^{-|\nabla I(p)|}$$

where p is the pixel on the depth map D and image I, $\nabla$ denotes a 2D differential operator, and |.| is the elementwise absolute value. The smoothness loss may be applied on three intermediate layers from the DispNet algorithm and the ExpNet algorithm.

Figure 6:
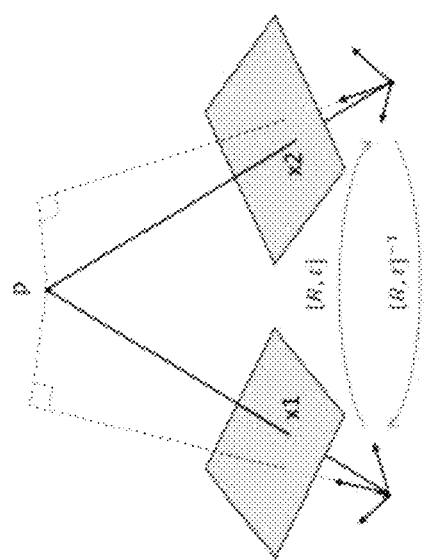
FIG. 6 is an example illustration regarding backward forward consistency.

Regarding backward-forward consistency, the training control module 204 may reinforce geometric consistency using the Lie group property. The set of three dimensional (3D) space transformations T form a Lie group $\mathbb{SE}(3)$, which may be represented by linear transformations on homogeneous vectors, T=[R, t]$\in \mathbb{SE}(3)$, with the rotation component R$\in \mathbb{SO}(3)$, and the translation component t$\in \mathbb{R}^3$. For every transformation T$\in \mathbb{SE}(3)$, there is an inverse transformation T$^{-1}\in \mathbb{SE}(3)$, such that TT$^{-1}$=I. An example illustration regarding backward forward consistency is provided in FIG. 6.

The pose module 312 (e.g., the PoseNet) estimates relative pose transformations from a given target to the source frames. For every pair of neighbor frames (t−1, t), the pose module 312 determines a forward transformation $\hat{T}_{t-1\to t}$ and a backward transformation $\hat{T}_{t\to t-1}$.

For every pair of transformations $\hat{T}_{t\to s}$ and $\hat{T}_{s\to t}$, the pose module 312 may impose an additional forward-backward geometric constraint. This requires the product of forward and backward transformations to be as close as possible to the identify matrix $I_{4\times 4}\in \mathbb{SE}(3)$. The corresponding loss may be defined over all pairs of the relative pose transformations:

$$\mathcal{L}_{bf} = \sum_s \sum_t |\hat{T}_{s\to t}\hat{T}_{t\to s} - I_{4\times 4}|$$

A total loss determined by the loss module 412 may be determined using the equation:

$$\mathcal{L}_{total}=\mathcal{L}_p+\lambda_{smo}\mathcal{L}_{smo}+\lambda_{reg}\mathcal{L}_{reg}+\lambda_{bf}\mathcal{L}_{bf}$$

where $\lambda_{smo}$, $\lambda_{reg}$, $\lambda_{bf}$ are hyper-parameters and may be predetermined values. For example only, $\lambda_{smo}$=0.1, $\lambda_{reg}$=0.1, $\lambda_{bf}$=0.1.

Figure 7:
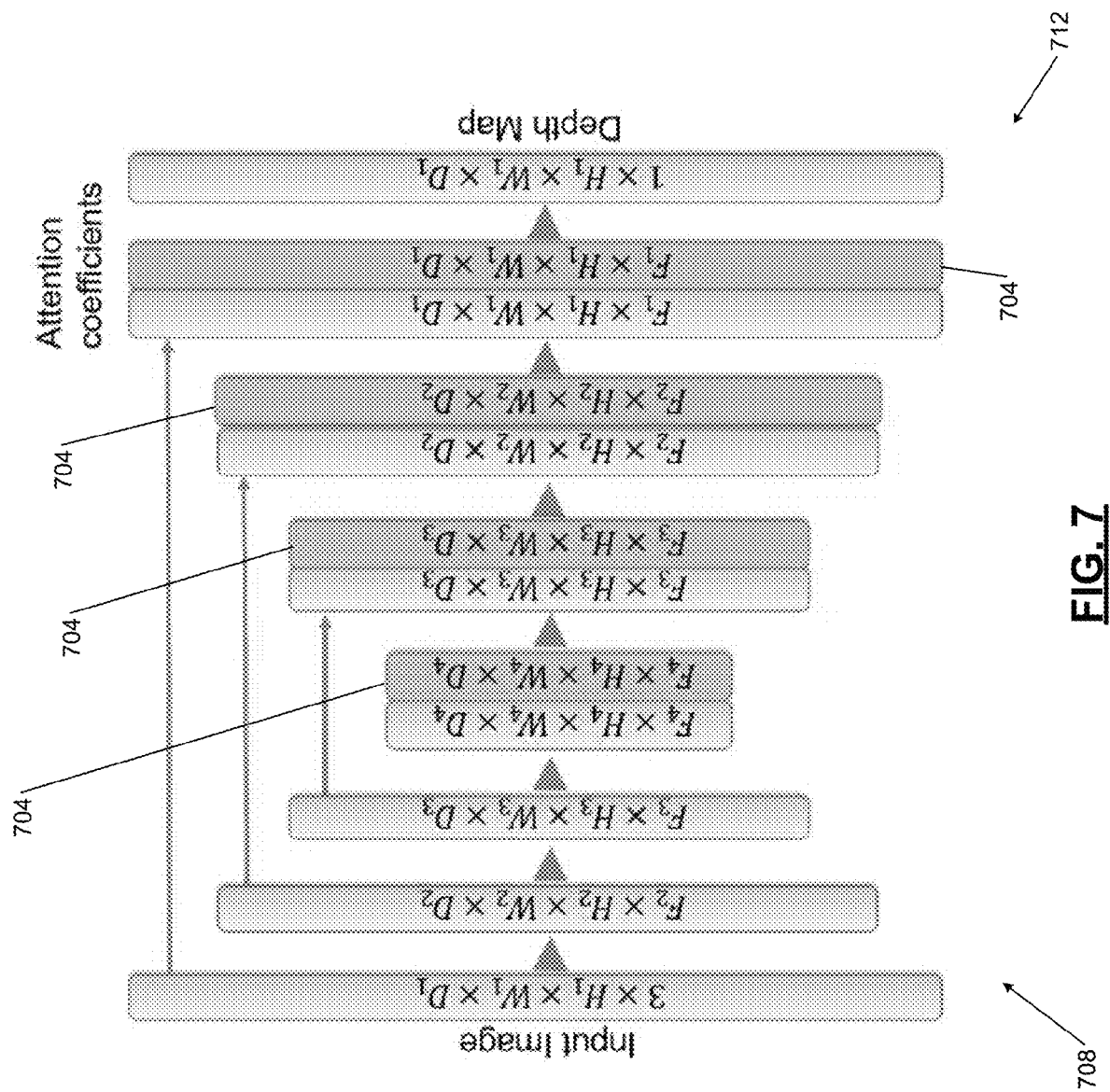
FIG. 7 is a functional block diagram of an example implementation of the depth module.

FIG. 7 is a functional block diagram of an example implementation of the depth module 308. The depth module 308 includes attention mechanisms illustrated by 704. The attention mechanisms let the depth module 308 know where to look within an image as the depth module 308 is determining depth and the motion module 316 is determining the motions.

The depth module 308 treats the depth estimation similarly to semantic segmentation. The depth module 308 considers each instance (group of pixels) as belonging to a certain semantic label/classification (e.g., pedestrian, sign, building, vehicle, etc.). The same group of pixels will have close and discontinuous depth values.

The reconstruction modules 404 and 408 pay attention to this idea (the attention map) and treat violations of this principle as a potential source of corrupted image reconstruction.

The attention mechanisms 704 are integrated within the depth module 308, as shown in FIG. 7. As shown in FIG. 7, the depth module 308 may include a plurality of encoder (convolutional) layers 708 (forming the encoder portion) and decoder (convolutional) layers 712 (forming the decoder portion). The decoder layers 712 and encoder layers 708 are illustrated in blue in FIG. 7, while the attention mechanisms 704 are illustrated in orange. The attention mechanisms 704 may be included with the decoder layers 712 (e.g., interleaved with the decoder layers 712). The attention mechanisms 704 may not be included in the encoder portion of the depth module 308. H, W, and D represent height, width, and depth, respectively, of the layers in FIG. 7. F may represent features. While the example of FIG. 7 illustrates 4 encoder layers and 4 decoder layers, another suitable number of encoder layers may be used, another suitable number of decoder layers may be used, or other suitable numbers of encoder or decoder layers may be used.

The encoder layers 708 each encode their inputs and generate a respective encoded output using an encoding algorithm. The encoding algorithms are unique to each encoder layer 708. The decoder layers 712 each decode their inputs and generate a respective decoded output using a decoding algorithm. The decoding algorithms are unique to each decoder layer 712.

The attention mechanisms 704 may be integrated as follows. Let $x^l=\{x_i^l\}_{i=1}^n$ be the activation map of a layer $l\in\{1,\ldots,L\}$ where each $x^l$ represents the pixel-wise feature vector of length $F_l$ (i.e., the number of channels). For each $x_i^l$, the attention mechanism 704 calculates attention coefficients $\alpha^l=\{\alpha_i^l\}_{i=1}^n$, $\alpha_i^l\in[0,1]$ to identify corrupted image regions and prune feature responses to preserve (e.g., only) activations that are relevant to accurate depth estimation. The output of an attention mechanism 704 can be described by $\hat{x}^l=\{\alpha_i^l x_i^l\}_{i=1}^n$, where each feature vector is scaled by the corresponding attention coefficient.

The attention mechanisms 704 determine the attention coefficients $\alpha_i^l$ as follows. In the depth module 308, the features on the coarse level identify location of target objects and model their relationship at the global scale. Let $g\in \mathbb{R}^{F_{ge}}$ be a global feature vector providing information to the attention mechanisms 704 to disambiguate task irrelevant feature content in $x^l$. Each $x^l$ and g is considered jointly to attend the features at each scale l that are (e.g., most) relevant to the objective being minimized. Relevance scores may be used to determine relevance, such as higher scores being more relevant and vice versa.

A gating vector of the attention mechanisms 704 includes contextual information for pruning of lower-level feature responses as suggested in the attention mechanisms 704 for image classification. Additive attention may be used as opposed to multiplicative attention, as additive attention may provide higher accuracy and can be described as follows $$q_{att,i}^l=\psi^T(\sigma_1(W_x^T x_i^l + W_g^T g + b_{xg}))+b_\psi$$

$$\alpha^l=\sigma_2(q_{att}^l(x^l,g_i;\Theta_{att}))$$

where $\sigma_1(x)$ is an element-wise nonlinear function, such as $\sigma_1(x)$=max(x, 0), and $\sigma_2(x)$ is a sigmoid activation function.

Each attention mechanism 704 is characterized by a set of parameters $\Theta_{att}$ including the linear transformations $W_x\in \mathbb{R}^{F_l*F_{int}}$, $W_g\in \mathbb{R}^{F_l*F_{int}}$, and bias terms $b_\psi\in\mathbb{R}$ and $b_{xg}\in\mathbb{R}^{F_{int}}$. The attention mechanism 704 parameters are trained by the training control module 204, such as with back-propagation updates together with other parameters of the depth module 308.

Figure 8:
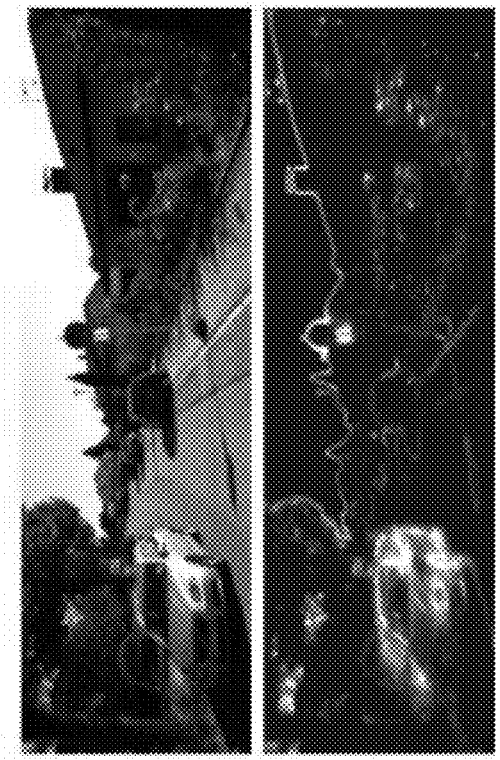
FIG. 8 includes three example images and the respective attention maps (of the attention coefficients for each pixel) generated by a depth module based on the images.
Figure 8:
Figure 8:

With the attention mechanisms 704 integrated in the depth module 308, the photometric loss above can be modified with attention coefficient $\alpha$ and pixel p instead (in place) of the explainability value E(p). FIG. 8 includes three example images and the respective attention maps (of the attention coefficients for each pixel) generated by the depth module 308 based on the images, as described above. FIG. 8 illustrates that the depth module 308 pays less attention to moving objects, as well as to 2D edges and boundaries of regions with discontinuous depth values sensitive to the erroneous depth estimation.

FIG. 8 visualizes the effect of attention coefficients as masks for down-weighting image regions that get corrupted in image reconstruction. FIG. 8 visualizes inverse attention, where lighter (whiter) areas refer to low attention coefficients thus having a lower weight and darker (blacker) colors refer to higher attention coefficients. Low attention coefficients point to pixels that have a high probability of being corrupted. this includes regions corresponding to moving objects, regions with discontinuous depth values, and region boundaries. Thing objects, such as street lights and sign poles may be down-weighted because of a high probability of depth discontinuity and corrupted image reconstruction.

The depth estimation provided by the depth module 308 can be evaluated using a testing dataset, such as the KITTI Raw dataset. The KITTI Raw dataset include 42,382 rectified stereo pairs from 61 scenes. Image size is 1242×375 pixels. The dataset may be split in 697 images that cover a total of 29 scenes. The remaining 32 scenes (23,488 images) may be used for training/validation split with 22,600/888 images, respectively.

For evaluation metrics, mean relative error (Abs Rel), squared relative error (Sq Rel), root mean squared error (RMSE), mean log 10 error (RMSE log), and the accuracy with threshold t where $t \in [1.25, 1.25^2, 1.25^3]$ may be used. The backward forward (BF) loss only (baseline), the attention gates only, and both the BF loss and the attention mechanisms were tested below. Table 1 below includes evaluation results relative to other methods of depth estimation not discussed herein.

problem. Rigid objects may be the most appropriate to estimate the change in position between frames. Also, unlike explainability, attention mechanisms do not require an additional module—they are integrated within the depth module 308. as described above.

For pose estimation evaluation, the KITTI visual odometry dataset may be used. The split may include 11 driving sequences with ground truth poses obtained by GPS readings. Sequence 09 and 10 may be used to evaluate the above relative to other approaches.

Absolute trajectory error (ATE) may be used as an evaluation metric. ATE measures the difference between points of the ground truth and the predicted trajectory. Using timestamps to associate the ground truth poses with the corresponding predicted poses, the difference between each pair of poses may be calculated, and the mean and standard deviation may be calculated and output.

Table 2 below shows that the methods described herein perform well. When coupled with the BF feature above, the attention mechanisms boost the performance of pose module training to have a consistent motion estimation and outperforms other methods which use additional models or pixel masks, thus increasing considerably their model size.

TABLE 2

| Method | Seq. 9 | Seq. 10 |
| --- | --- | --- |
| ORB-SLAM full | 0.014 ± 0.008 | 0.012 ± 0.011 |
| ORB-SLAM short | 0.064 ± 0.141 | 0.064 ± 0.130 |
| Zhou et al | 0.016 ± 0.009 | 0.013 ± 0.009 |
| Mahjourian et al | 0.013 ± 0.010 | 0.012 ± 0.0011 |
| Almalioglu et al | 0.009 ± 0.005 | 0.010 ± 0.0013 |

TABLE 1

| | | Error Metric | | | | Accuracy Metric | | |
| --- | --- | --- | --- | --- | --- | --- | --- | --- |
| Method | Supervision | Abs. rel | Sq Rel | RMSE | RSME log | δ < 1.25 | δ < $1.25^2$ | δ < 1.25 |
| Eigen et al Coarse | Depth | 0.214 | 1.605 | 6.563 | 0.292 | 0.673 | 0.884 | 0.957 |
| Eigen et al Fine | Depth | 0.203 | 1.548 | 6.307 | 0.282 | 0.702 | 0.890 | 0.958 |
| Liu et al | pose | 0.202 | 1.614 | 6.523 | 0.275 | 0.678 | 0.895 | 0.965 |
| Godard et al | no | 0.148 | 1.344 | 5.927 | 0.247 | 0.803 | 0.922 | 0.964 |
| Zhou et al (no explain) | no | 0.221 | 2.226 | 7.527 | 0.294 | 0.676 | 0.885 | 0.954 |
| Zhou et al (w/ explain) | no | 0.208 | 1.768 | 6.856 | 0.283 | 0.678 | 0.885 | 0.957 |
| Almalioglu et al | no | 0.138 | 1.155 | 4.412 | 0.232 | 0.820 | 0.939 | 0.976 |
| Shen et al | no | 0.156 | 1.309 | 5.73 | 0.236 | 0.797 | 0.929 | 0.969 |
| Bian et al | no | 0.137 | 1.089 | 6.439 | 0.217 | 0.830 | 0.942 | 0.975 |
| This application w/BF | no | 0.213 | 1.849 | 6.781 | 0.288 | 0.679 | 0.887 | 0.957 |
| This application w/attention | no | 0.171 | 1.281 | 5.981 | 0.252 | 0.755 | 0.921 | 0.968 |
| This application w/BF + attention | no | 0.162 | 1.126 | 5.284 | 0.221 | 0.823 | 0.935 | 0.971 |

The methods described herein provide comparable or better results without using additional the attention relative to the baseline and may outperform supervised and most unsupervised techniques and shows performance comparable to other methods which extend the baseline with additional modules and components.

The results prove that using the attention coefficients as a mask for image reconstruction is effective. The regions of interest are more likely the rigid objects that the network will have more confidence to estimate their depth (the depth will be almost equal over the object), similar to the segmentation TABLE 2-continued

| Method | Seq. 9 | Seq. 10 |
| --- | --- | --- |
| Shen et al | 0.0089 ± 0.0054 | 0.0084 ± 0.0071 |
| This application w/BF | 0.0101 ± 0.0065 | 0.0091 ± 0.0069 |
| This application w/attention | 0.0108 ± 0.0062 | 0.0082 ± 0.0063 |
| This application w/BF + attention | 0.0087 ± 0.0054 | 0.0078 ± 0.0061 |

Figure 9:
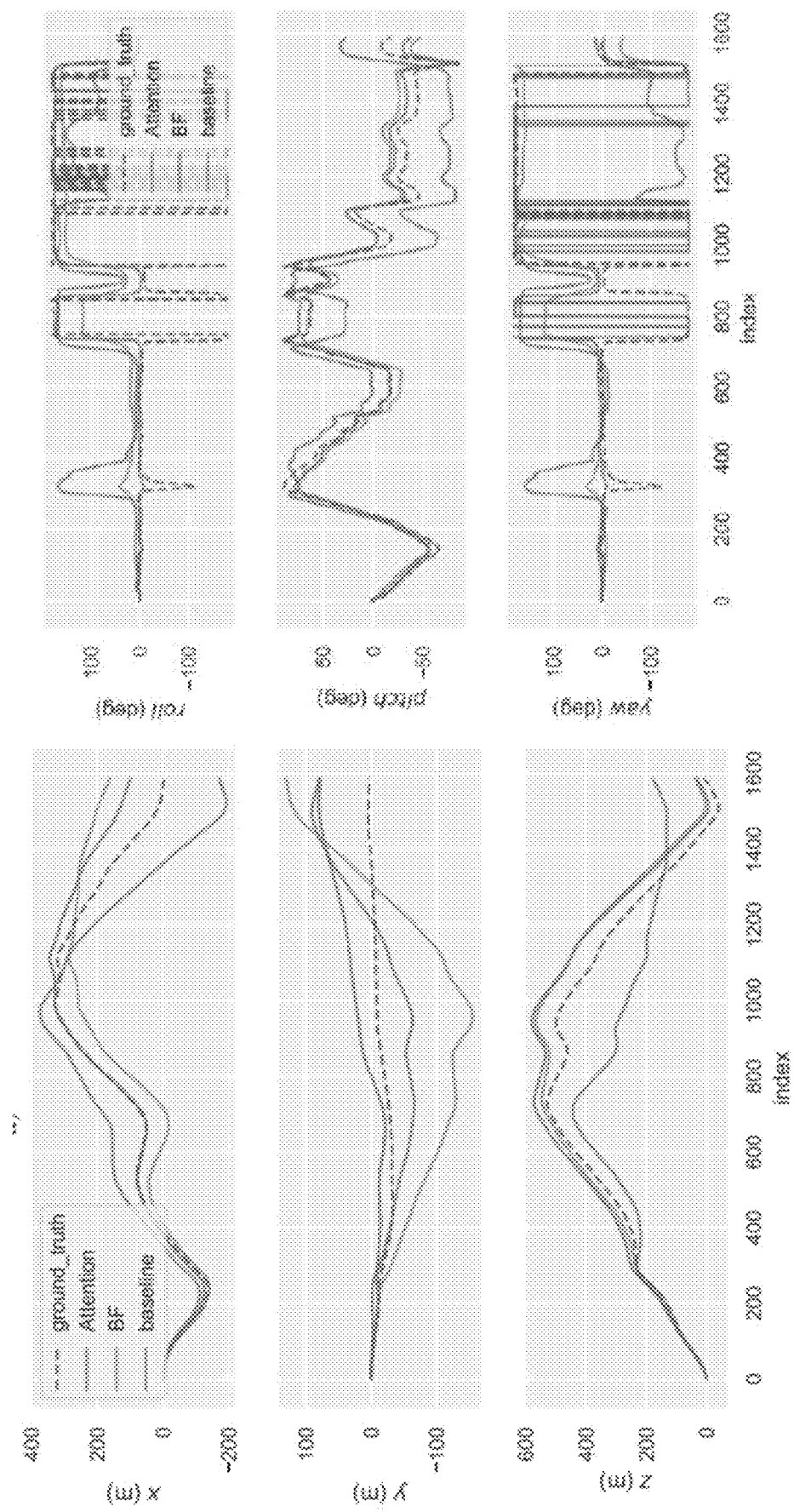
FIG. 9 includes example graphs that visualize estimated poses relative to ground truths for each degree of freedom, the translation (x, y, z) and rotation (roll, pitch, yaw)

FIG. 9 includes example graphs that visualize estimated poses by the pose module 312 relative to ground truths for each degree of freedom, the translation (x, y, z) and rotation (roll, pitch, yaw). FIG. 9 illustrates the oscillation of roll and yaw values and their discontinuity when put in [−π, π] interval while orientation changes are continuous in the real world.

The depth module 308, the pose module 312, and the motion module 316 discussed above requires less parameters and allows for faster training than other methods. Adding the BF loss may have only a negligible impact on the training time with respect to the baseline. Adding the attention mechanisms 704 increases the model size only minimally, such as by 5-10%, and increases training time by only 10-25%. As described above, however, the concepts improve performance in the self-supervised setting.

Adding the BF consistency loss to the training process allowed to boost the performance. The methods described herein force the trained/learned models to respect the geometric principles but adding penalties for any consistency violation.

Figure 10:
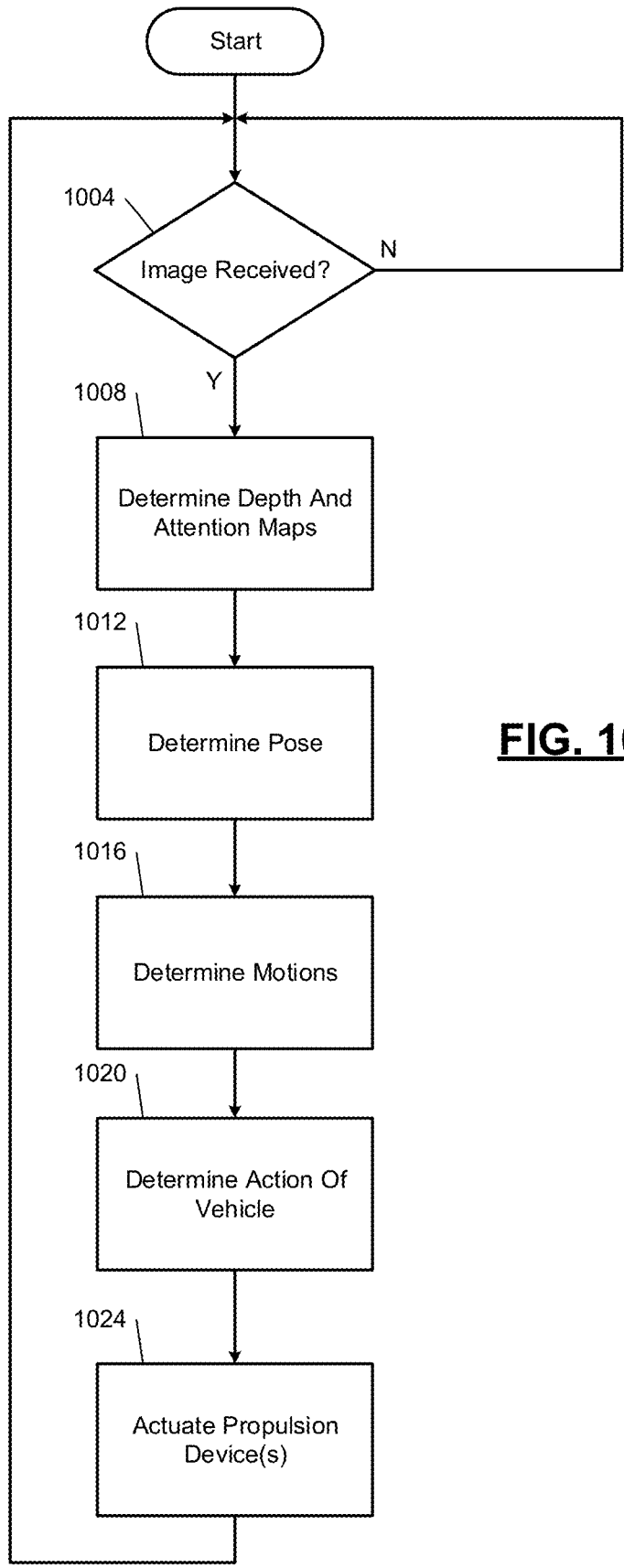
FIG. 10 includes a flowchart depicting an example method of estimating depth and motion and controlling a navigating robot.

FIG. 10 includes a flowchart depicting an example method of estimating depth and motion and controlling the navigating robot 100. Control begins with 1004 where the depth and motion module 110 determines whether an image has been received from the camera 104. If true, the buffer module 304 updates the output images, and control continues with 1008. The buffer module 304 may output the received image (from 1004) as the image at time t+1, output the image received last as the image at time t, and output the image received second to last as the image at time t−1.

At 1008, the depth module 308 determines the depth and attention maps, as described above, based on the image at time t. The depth module 308 includes the attention mechanisms 708 that generate the attention map (including the attention coefficients/values), as described above.

At 1012, the pose module 312 determines the poses at times t+1, t, and t−1, as described above. At 1016, the motion module 316 determines the motions from time t−1 to time t and from time t to time t+1, as described above.

At 1020, the control module 112 determines whether and how to move the navigating robot 100 based on the depth map and the motions, such as described above. At 1024, the control module 112 actuates one or more of the propulsion devices 108 to move the navigating robot 100 as determined if the control module 112 determines to move the navigating robot 100. If the control module 112 determined to not move the navigating robot 100, the control module 112 may not actuate any of the propulsion devices and/or apply one or more brakes. Control may return to 1004 for a next loop/image.

Figure 11:
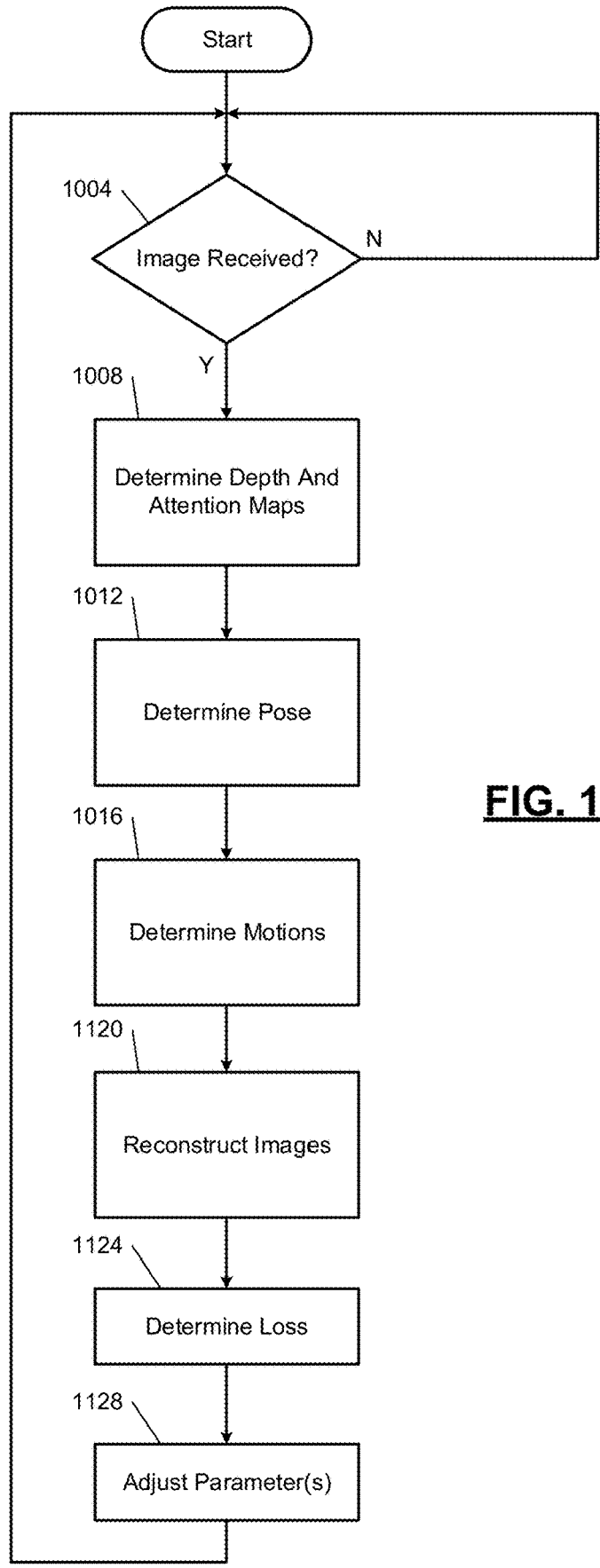
FIG. 11 includes a flowchart depicting an example method of training the depth and motion module 110.

FIG. 11 includes a flowchart depicting an example method of training the depth and motion module 110 (the depth module 308, the pose module 312, and the motion module 316). Control begins with 1004-1016, as described above. In the example of training, training images may be input from memory or input from a camera.

At 1120, the reconstruction modules 408 and 408 reconstruct the images at time t+1 and time t−1 based on the images at time t+1 and t−1 and the attention maps for time t+1 and time t−1, respectively. At 1124, the loss module 412 determines the loss, as described above. The loss module 412 may determine the loss based on the images at time t+1, t−1, and the reconstructed images at time t+1 and t−1. At 1128, based on the loss (e.g., to reduce or minimize the loss), the training module 416 may selectively adjust one or more parameters of one or more of the depth module 308, the pose module 312, and the motion module 316. Control may then return to start for a next image.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system, comprising:
a depth module including an encoder and a decoder and configured to:
receive a first image from a first time from a camera; and
based on the first image and using the encoder and the decoder, generate a depth map including depths between the camera and objects in the first image;
a pose module configured to:
generate a first pose of the camera based on the first image;
generate a second pose of the camera for a second time based on a second image received from the camera before the first image; and
generate a third pose of the camera for a third time based on a third image received from the camera after the first image;
a motion module configured to:
determine a first motion of the camera between the second time and the first time based on the first pose and the second pose; and
determine a second motion of the camera between the second time and the third time based on the second pose and the third pose,
wherein the depth module includes attention mechanisms configured to, based on the first image, generate an attention map including attention coefficients indicative of amounts of attention to attribute to the objects in the first image;
a first reconstruction module configured to reconstruct the second image using the attention map, the depth map, and the first motion between the second time and the first time to produce a reconstructed second image;
a second reconstruction module configured to reconstruct the third image using the attention map, the depth map, and the second motion between the second time and the third time to produce a reconstructed third image; and
a training module configured to, based on at least one of the reconstructed second image and the reconstructed third image, selectively adjust at least one parameter of at least one of depth module, the pose module, and the motion module.

2. A vehicle, comprising:
the system of claim 1;
a propulsion device configured to propel the vehicle; and
a control module configured to actuate the propulsion device based on the depth map.

3. The vehicle of claim 2, wherein the vehicle includes the camera and does not include any other cameras.

4. The vehicle of claim 2, wherein the vehicle does not include any radars, any sonar sensors, any laser sensors, or any light detection and ranging (LIDAR) sensors.

5. A vehicle, comprising:
the system of claim 1;
a propulsion device configured to propel the vehicle; and
a control module configured to actuate the propulsion device based on at least one of:
the first motion; and
the second motion.

6. The system of claim 1 wherein the first, second, and third poses are 6 degree of freedom poses.

7. The system of claim 1 wherein the attention mechanisms include attention gates.

8. The system of claim 1 wherein the decoder includes the attention mechanisms.

9. The system of claim 8 wherein the encoder does not include any attention mechanisms.

10. The system of claim 8 wherein the decoder includes decoder layers and the attention mechanisms are interleaved with the decoder layers.

11. The system of claim 1 wherein the training module is configured to selectively adjust the at least one parameter based on the reconstructed second image, the reconstructed third image, the second image, and the third image.

12. The system of claim 11 wherein the training module is configured to selectively adjust the at least one parameter based on:
- a first difference between the reconstructed second image and the second image; and
- a second difference between the reconstructed third image and the third image.

13. The system of claim 1 wherein the training module is configured to jointly train the depth module, the pose module, and the motion module.

14. The system of claim 1 wherein:
- the first reconstruction module is configured to reconstruct the second image using an image warping algorithm; and
- the second reconstruction module is configured to reconstruct the third image using the image warping algorithm.

15. The system of claim 14 wherein the image warping algorithm includes an inverse image warping algorithm.

16. The system of claim 1 wherein the pose module is configured to generate the first, second, and third poses using a PoseNet algorithm.

17. The system of claim 1 wherein the depth module includes a DispNet encoder-decoder network.

18. A method, comprising:
- receiving a first image from a first time from a camera;
- based on the first image, generating a depth map including depths between the camera and objects in the first image;
- generating a first pose of the camera based on the first image;
- generating a second pose of the camera for a second time based on a second image received from the camera before the first image; and
- generating a third pose of the camera for a third time based on a third image received from the camera after the first image;
- determining a first motion of the camera between the second time and the first time based on the first pose and the second pose;
- determining a second motion of the camera between the second time and the third time based on the second pose and the third pose;
- based on the first image, generate an attention map including attention coefficients indicative of amounts of attention to attribute to the objects in the first image;
- reconstructing the second image using the attention map, the depth map, and the first motion between the second time and the first time to produce a reconstructed second image;
- reconstructing the third image using the attention map, the depth map, and the second motion between the second time and the third time to produce a reconstructed third image; and
- based on at least one of the reconstructed second image and the reconstructed third image, selectively adjust at least one parameter.

19. A system, comprising:
one or more processors; and
memory including code that, when executed by the one or more processors, perform functions including:
- receiving a first image from a first time from a camera;
- based on the first image, generating a depth map including depths between the camera and objects in the first image;
- generating a first pose of the camera based on the first image;
- generating a second pose of the camera for a second time based on a second image received from the camera before the first image; and
- generating a third pose of the camera for a third time based on a third image received from the camera after the first image;
- determining a first motion of the camera between the second time and the first time based on the first pose and the second pose;
- determining a second motion of the camera between the second time and the third time based on the second pose and the third pose,
- based on the first image, generating an attention map including attention coefficients indicative of amounts of attention to attribute to the objects in the first image;
- reconstructing the second image using the attention map, the depth map, and the first motion between the second time and the first time to produce a reconstructed second image;
- reconstructing the third image using the attention map, the depth map, and the second motion between the second time and the third time to produce a reconstructed third image; and
- based on at least one of the reconstructed second image and the reconstructed third image, selectively adjusting at least one parameter.

20. A system, comprising:
a first means for:
- receiving a first image from a first time from a camera; and
- based on the first image, generating a depth map including depths between the camera and objects in the first image;
a second means for:
- generating a first pose of the camera based on the first image;
- generating a second pose of the camera for a second time based on a second image received from the camera before the first image; and
- generating a third pose of the camera for a third time based on a third image received from the camera after the first image;
a third means for:
- determining a first motion of the camera between the second time and the first time based on the first pose and the second pose; and
- determining a second motion of the camera between the second time and the third time based on the second pose and the third pose;

wherein the first means includes attention mechanisms configured to, based on the first image, generate an attention map including attention coefficients indicative of amounts of attention to attribute to the objects in the first image;
a fourth means for reconstructing for reconstructing the second image using the attention map, the depth map, and the first motion between the second time and the first time to produce a reconstructed second image;
a fifth means for reconstructing the third image using the attention map, the depth map, and the second motion between the second time and the third time to produce a reconstructed third image; and
a sixth means for, based on at least one of the reconstructed second image and the reconstructed third image, selectively adjusting at least one parameter of at least one of the first means, the second means, and the third means.

* * * * *